(12) United States Patent
Ren et al.

(10) Patent No.: US 11,709,178 B2
(45) Date of Patent: Jul. 25, 2023

(54) ACCELEROMETER STRUCTURE INCLUDING PHOTONIC CRYSTAL CAVITY (71) Applicant: Shenzhen Conjugate Technology Co., Ltd., Shenzhen (CN)

(72) Inventors: Hengjiang Ren, Shenzhen (CN); Jie Luo, Shenzhen (CN)

(73) Assignee: Shenzhen Conjugate Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/717,169

(22) Filed: Apr. 11, 2022

(65) Prior Publication Data

US 2022/0341963 A1     Oct. 27, 2022

(30) Foreign Application Priority Data

Apr. 22, 2021   (CN) .......................... 202110437872.4

(51) Int. Cl.
*G01P 15/00* (2006.01)
*G01P 15/093* (2006.01)
*G01H 9/00* (2006.01)

(52) U.S. Cl.
CPC ........... *G01P 15/093* (2013.01); *G01H 9/004* (2013.01)

(58) Field of Classification Search
None
See application file for complete search history.

(56) References Cited

U.S. PATENT DOCUMENTS

| 9,618,531 | B2 * | 4/2017 | Painter | G01N 21/59 |
| 9,927,458 | B2 * | 3/2018 | Bramhavar | H03H 9/02338 |
| 2014/0283601 | A1 * | 9/2014 | Bhave | G01B 11/14 |
| | | | | 73/504.12 |
| 2015/0020590 | A1 * | 1/2015 | Painter | G01N 21/55 |
| | | | | 438/48 |
| 2018/0172723 | A1 * | 6/2018 | Bramhavar | H03H 9/2431 |

FOREIGN PATENT DOCUMENTS

| CN | 101782594 A | * | 6/2011 |
| CN | 110329982 A | * | 10/2019 |

* cited by examiner

*Primary Examiner* — Lisa M Caputo
*Assistant Examiner* — Nigel H Plumb (57)   ABSTRACT

An accelerometer structure, a method for preparing the accelerometer structure and an acceleration measurement method are provided. The accelerometer structure includes a substrate having a groove structure, a test mass, a plurality of nano-tethers, and a nano-photonic-crystal measurement unit. The test mass, nano-tethers, and the nano-photonic-crystal measurement unit are suspended above the groove structure. A nano-photonic-crystal resonant cavity is formed in the nano-photonic-crystal measurement unit, and an acceleration of the test mass is characterized by a resonant frequency of the nano-photonic-crystal resonant cavity. The present disclosure provides a photoelasticity-based opto-micromechanical accelerometer structure, which uses a cavity resonance tension sensor in a nano-photonic-crystal cavity to measure a tension of the nano-photonic-crystal resonant cavity. The tension is concentrated in the nano-photonic-crystal resonant cavity, which makes the measurement of the tension more accurate and the resolution higher. Photoelastic-optomechanical coupling is also increased due to the nano-photonic-crystal resonant cavity.

9 Claims, 6 Drawing Sheets

ACCELEROMETER STRUCTURE INCLUDING PHOTONIC CRYSTAL CAVITY

CROSS REFERENCE TO RELATED APPLICATION

This application claims the benefits of priority to Chinese Patent Application No. CN 2021104378724, entitled "Accelerometer Structure, Method for Preparing Accelerometer Structure and Acceleration Measurement Method", filed with CNIPA on Apr. 22, 2021, the content of which is incorporated herein by reference in its entirety.

FIELD OF TECHNOLOGY

The present disclosure relates to the field of acceleration measurement, and more specifically, to an accelerometer structure, a method for preparing an accelerometer structure, and an acceleration measurement method.

BACKGROUND

An accelerometer measures linear acceleration of carriers, and plays an important role in fields of inertial navigation, inertial guidance, and controlled testing equipment. It is also widely used in aviation, navigation, vehicles, consumer electronics, medical care, weapons guidance and other similar fields. After decades of development, there are many types of accelerometers. Among them, optical accelerometers have become a research hotspot in recent years due to their electromagnetic interference resistance, electrical insulation, corrosion resistance, and other characteristics. Meanwhile, the development of modern optical fiber sensing technology and micro-mechanical manufacturing technology also provides a favorable condition for the study of optical accelerometers.

When applied in mechanical system maintenance, inertial navigation, or consumer electronics, monitoring of accelerometers is also crucial. A basic operating principle of accelerometers is to measure a displacement of a flexibly mounted test mass or a force exerted on the flexibly mounted test mass. Currently, a capacitor, a piezoelectric element, a tunnel current, or optical techniques can be adopted to sensitively measure displacements or forces. However, traditional optical accelerometers have many disadvantages; for example, they have limited functions, incur high production costs, and require large proof masses, which precludes chip-level integration and therefore hinders their application in the civilian market. Micro-electro-mechanical Inertial Measurement Units (MEMS IMUs) have advantages of small size, low power consumption, and low cost, but their accuracy, measurement range, and bandwidth cannot meet needs of future applications.

Therefore, it is necessary to provide a novel accelerometer structure, a method for preparing an accelerometer structure, and an acceleration measurement method to solve the above problems in the prior art.

SUMMARY

The present disclosure provides an accelerometer structure. The accelerometer structure comprises a substrate, wherein a groove structure is formed in the substrate; a test mass, suspended above the groove structure; a plurality of nano-tethers, suspended above the groove structure, for connecting the test mass and the substrate; and a nano-photonic-crystal measurement unit, suspended above the groove structure, for connecting the test mass and the substrate, wherein a nano-photonic-crystal resonant cavity is formed in the nano-photonic-crystal measurement unit, and an acceleration of the test mass is characterized by a resonant frequency of the nano-photonic-crystal resonant cavity.

In an embodiment of the present disclosure, a force exerted on the test mass is in a first direction, and a direction perpendicular to the first direction is a second direction; wherein the number of the nano-tethers is an even number, and the nano-tethers are symmetrically arranged on two sides of the test mass along the first direction; the nano-photonic-crystal measurement unit is arranged on one side of the test mass, and is arranged in the first direction relative to the test mass.

In an embodiment of the present disclosure, the length of the nano-tethers along the second direction is in a range of 50 μm to 1 mm, and the width of the nano-tethers along the first direction is in a range of 300 nm to 10 μm.

In an embodiment of the present disclosure, a material of the test mass includes any one of silicon nitride and silicon; a material of the nano-photonic-crystal measurement unit includes any one of silicon nitride and silicon; a material of the nano-tethers includes any one of silicon nitride and silicon.

In an embodiment of the present disclosure, the accelerometer structure further comprises an optical waveguide structure, connected to the nano-photonic-crystal resonant cavity.

In an embodiment of the present disclosure, the nano-photonic-crystal resonant cavity is set based on an optomechanical coupling rate, wherein the optomechanical coupling rate $g = g_0 \sqrt{\bar{n}_{cav}}$, $g_0$ represents a single-photon coupling rate, $\bar{n}_{cav}$ represents the number of photons in the nano-photonic-crystal resonant cavity.

In an embodiment of the present disclosure, the nano-photonic-crystal measurement unit includes a central measurement area, and the central measurement area is defined to have an X direction and a Y direction that are perpendicular to each other; the central measurement area comprises at least one row of first holes, and two rows of second holes respectively located on two sides of the first holes along the Y direction; the arrangement of each row of holes in the central measurement area along the X direction is as follows: two adjacent first holes or second holes in each row form a group, and a hole distance exists between the two adjacent holes in each group, the further the group is away from a center of the central measurement area, the smaller the corresponding hole distance becomes, thereby forming the nano-photonic-crystal resonant cavity.

The present disclosure also provides a method for preparing an accelerometer structure. The method comprises: providing a substrate, wherein the substrate comprises a handle layer and a device layer formed on the handle layer; preparing a test mass, a plurality of nano-tethers, and a nano-photonic-crystal measurement unit in the device layer by adopting a photolithography and etching process; and forming a groove structure by removing part of the substrate using a wet or dry etching process, to suspend the test mass, the nano-tethers, and the nano-photonic-crystal measurement unit above the groove structure.

In an embodiment of the present disclosure, the handle layer is a silicon layer, and the device layer is a silicon nitride layer; or, the substrate is a silicon-on-insulator substrate, wherein the silicon-on-insulator substrate comprises a top silicon layer and an intermediate buried oxide layer, wherein the test mass, the nano-tethers and the nano-photonic-crystal measurement unit are formed in the top silicon layer, and the groove structure is formed in the intermediate buried oxide layer.

The present disclosure provides an acceleration measurement method adopting an accelerometer structure. The acceleration measurement method comprises providing the accelerometer structure as described above; exerting an external force on the test mass, to provide the acceleration to be measured of the test mass; and acquiring a resonant frequency of the nano-photonic-crystal resonant cavity in the nano-photonic-crystal measurement unit, to characterize the acceleration of the test mass according to the resonant frequency of the nano-photonic-crystal resonant cavity and its changes.

In an embodiment of the present disclosure, the resonant frequency of the nano-photonic-crystal resonant cavity and its changes are acquired through an optical waveguide structure.

As described above, the present disclosure provides an accelerometer structure, a method for preparing the accelerometer structure, and an acceleration measurement method. The present disclosure provides a photoelasticity-based opto-micromechanical accelerometer structure, which uses a cavity resonance tension sensor in a nano-photonic-crystal resonant cavity to measure a tension of the nano-photonic-crystal resonant cavity. The tension is generated by the acceleration of a chip exerted on the nano-photonic-crystal resonant cavity. The test mass is displaced by the acceleration of the chip and the tension is generated by the displacement of the test mass. The tension is concentrated in the nano-photonic-crystal resonant cavity, which makes the measurement of the tension more accurate and the resolution higher. Photoelastic-optomechanical coupling are also increased due to the existence of the nano-photonic-crystal resonant cavity. The nano-photonic-crystal resonant cavity provides a high quality factor (Q-factor), and improves the optomechanical coupling, which makes the measurement of the tension more accurate.

| Reference Numerals | |
| --- | --- |
| 1 | Substrate |
| 100 | Handle layer |
| 101 | Device layer |
| 102 | Test mass |
| 103 | Nano-tethers |
| 104 | Nano-photonic-crystal measurement unit |
| 104a | First holes |
| 104b | Second holes |
| 104c | Central measurement area |
| 105 | Groove structure |
| 200 | Bottom silicon layer |
| 201 | Intermediate buried oxide layer |
| 202 | Top silicon layer |
| 203 | Test mass |
| 204 | Groove structure |
| S1-S4 and S1'-S3' | Steps |

DETAILED DESCRIPTION

The embodiments of the present disclosure will be described below through specific examples. One skilled in the art can easily understand other advantages and effects of the present disclosure according to contents disclosed in the description. The present disclosure may also be implemented or applied through other different embodiments, and various modifications or changes may be made to all details in the description based on different points of view and applications without departing from the spirit of the present disclosure.

For example, when describing the embodiments of the present disclosure in detail, for ease of description, a cross-sectional view for showing a device structure is partially enlarged not necessarily to scale, and the schematic diagram is merely an example and is not intended to limit the scope of the present disclosure. In addition, the three-dimensional spatial dimensions of length, width and depth should be included in the actual production.

For ease of description, spatial terms, such as "under", "below", "lower", "beneath", "above", "upper", and the like, may be used herein to describe the relationship between one element or feature and another element or feature as shown in the accompanying drawings. It is to be understood that these spatial terms are intended to encompass other directions of the device in use or operation than the directions depicted in the accompanying drawings. In addition, when a layer is referred to as being "between" two layers, the layer may be the only layer between the two layers, or one or more layers may be present therebetween. As used herein, "between . . . and . . . " means that two endpoint values are included.

In the context of this present disclosure, a structure in which a first feature is described as being "on" a second feature may include an embodiment in which the first feature and the second feature are in direct contact with each other, or may include an embodiment in which there is another feature formed between the first feature and the second feature.

It should be noted that, the drawings provided in this embodiment only exemplify the basic idea of the present disclosure. Although only the components related to the present disclosure are shown in the drawings, they are not drawn according to the quantities, shapes, and sizes of the components during actual implementation. During actual implementation, the patterns, quantities, and proportions of the components may be changed as needed, and the layout of the components may be more complicated.

Embodiment 1

Referring to FIGS. 2-12, the present disclosure provides an accelerometer structure. The accelerometer structure includes a substrate 1, a test mass 102, a plurality of nano-tethers 103, and a nano-photonic-crystal measurement unit 104.

In the accelerometer structure, each effective component in the accelerometer structure is prepared based on the substrate 1. Where the substrate 1 may be a single material layer, or may be a structure composed of two or more material layers. In addition, a groove structure 105 is formed in the substrate 1 and is used to suspend structural components for acceleration measurements.

The accelerometer structure of the present invention performs acceleration measurements based on the test mass 102 and the nano-photonic-crystal measurement unit 104 connected to the test mass 102. Both the test mass 102 and the nano-photonic-crystal measurement unit 104 are suspended above the groove structure 105. In addition, the test mass 102 is connected to the substrate 1 through multiple nano-tethers 103, so that the test mass 102 is suspended above the groove structure 105. At the same time, the multiple nano-tethers 103 are also suspended above the groove structure 105. Multiple nano-tethers 103 and the nano-photonic-crystal measurement unit 104 connect an unsuspended part of a device layer to the substrate 1.

In an embodiment, the number of nano-tethers 103 is an even number, and the nano-tethers 103 are symmetrically arranged on two sides of the test mass 102. Preferably, the direction of a force exerted on the test mass 102 is defined as a first direction, and a direction perpendicular to the first direction is defined as a second direction. The nano-tethers 103 are symmetrically arranged on two sides of the test mass 102 along the first direction, and the nano-tethers 103 extend in the second direction. The nano-photonic-crystal measurement unit 104 is arranged on one side of the test mass 102. In an embodiment, the nano-photonic-crystal measurement unit 104 is arranged in the first direction. That is, a connecting line between the nano-photonic-crystal measuring unit 104 and the test mass 102 is parallel to the direction of the force exerted the test mass 102. An upper surface of the test mass 102 is parallel to a surface of the substrate 1. Both the first direction and the second direction are parallel to the upper surface of the test mass 102. The direction perpendicular to the upper surface of the test mass 102 is a third direction.

In an embodiment, the length d of nano-tethers 103 along the second direction is within the range of 50 μm to 1 mm, for example, 200 μm, 500 μm, 800 μm. The width w of nano-tethers 103 along the first direction is within the range of 300 nm to 10 μm, for example, 600 nm, 1 μm, 2 μm, 3 μm, 4 μm, 6 μm, 8 μm, 9 μm.

The test mass 102 is suspended on nano-tethers 103 under a high tensile stress. The nano-tethers 103 may be nano-tethers of a high aspect ratio. Mechanical properties of the accelerometer are adjusted by adjusting the width and length of nano-tethers, and the length and width of the nano-photonic-crystal resonant cavity, so that the accelerometer has a reduced equivalent acceleration noise, and a large operating bandwidth. By adjusting the design of nano-tethers 103, the test mass 102 may be adjusted to have a suitable resonant frequency, which is beneficial to the performance of the accelerometer. In addition, mechanical properties of a mechanical vibration block (the test mass 102) may also be adjusted by adjusting the length and width of an optical cavity (the nano-photonic-crystal resonant cavity), which is beneficial to the performance of the accelerometer.

In an embodiment, a nano-photonic-crystal resonant cavity is formed in the nano-photonic-crystal measurement unit 104, and acceleration of the test mass 102 is characterized by a resonant frequency of the nano-photonic-crystal resonant cavity.

In an embodiment, the width of the nano-photonic-crystal measurement unit 104 along the second direction is in the range of 3-20 μm, for example, 6 μm, 10 μm, 15 μm. The length of the nano-photonic-crystal measurement unit 104 along the first direction is in the range of 1-12 μm, for example, 2 μm, 6 μm, 12 μm. The length of the test mass 102 is in a range of 50 μm-2 mm, for example, 100 μm; and the width of the test mass 102 is in a range of 50 μm-2 mm, for example, 200 μm.

Components of the accelerometer structure may be fully integrated on a chip, and the accelerometer structure has a higher tension resolution due to its strong photoelastic-optomechanical coupling. The mechanical tension generated in the nano-photonic crystal may change optical properties of the material of the nano-photonic crystal, thereby generating a photoelastic coupling. The accelerometer structure in the present disclosure may be used in almost any application where an accelerometer is required. In addition, smaller test mass may have a higher resonant frequency. The resonant frequency of the test mass 102 determines an upper frequency limit, which corresponds to the highest acceleration that the accelerometer may measure. Based on the formula F=ma (F represents a force, m represents a mass, a represents the resulting acceleration), when the acceleration a remains constant, the smaller the mass m, the smaller the force F. The force F measured by using an optical measurement method is more accurate and the resolution is higher. Compared with a traditional micro-electro-mechanical system (MEMS), the present disclosure allows for a smaller test mass so as to achieve a higher upper frequency limit. That is, a wider bandwidth of the accelerometer is acquired, which is also one advantage of the present disclosure.

During the process of acceleration measurements, when acceleration is exerted on the chip, the test mass 102 is subjected to a force (corresponding to the acceleration), and the nano-photonic-crystal measurement unit 104 connected to the test mass 102 is simultaneously affected by the force and internally generates a stress. In an embodiment, a connecting line between the nano-photonic-crystal measuring unit 104 and the test mass 102 is parallel to a direction of the force. The force exerted on the nano-photonic-crystal measuring unit 104 has the same direction and magnitude as that on the test mass 102, and a stress is generated in the nano-photonic-crystal measuring unit 104. The stress makes a material (e.g., the nano-photonic-crystal measuring unit 104) produce a strain, and the strain will affect a dielectric constant of the material (e.g., the nano-photonic-crystal measuring unit 104). The greater the stress, the more the dielectric constant of the material changes. The change of the dielectric constant of the material will further affect optical properties (e.g., the resonant frequency of the nano-photonic-crystal resonant cavity) of the photonic-crystal. By detecting the resonant frequency of the nano-photonic-crystal resonant cavity, the stress in the material may be deduced, then the acceleration may be obtained.

In an embodiment, referring to FIGS. 2-5, the substrate 1 includes a handle layer 100 and a device layer 101 formed on the handle layer 100. The handle layer 100 includes a silicon layer, the device layer 101 includes a silicon nitride layer. The test mass 102, nano-tethers 103 and the nano-photonic-crystal measurement unit 104 are prepared in the silicon nitride layer, and the groove structure 105 is formed in the silicon layer. In an embodiment, the thickness of the device layer 101 may be several hundred nanometers, such as, 200-800 nm. For example, the thickness of the device layer 101 is 300 nm, 500 nm, or 600 nm. The thickness of the handle layer 100 may be several hundreds of micrometers, such as, 300-900 μm. For example, the thickness of the handle layer 100 is 400 μm, 500 μm, 800 μm. The handle layer 100 may be used as a supporting layer.

Figure 6:
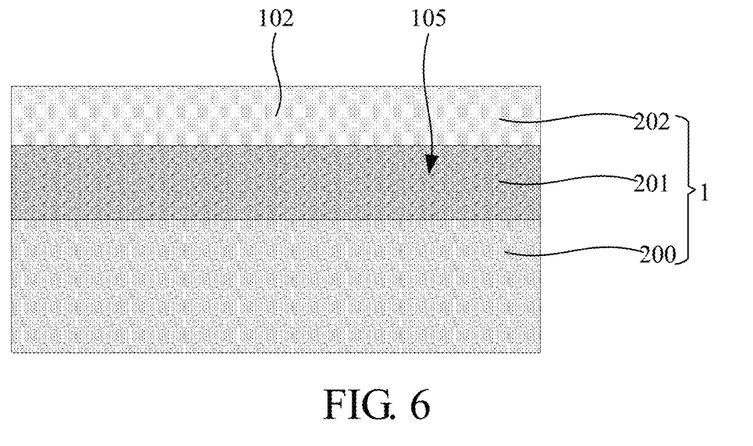
FIG. 6 is a schematic diagram of a substrate in an accelerometer structure according to an embodiment of the present disclosure.
Figure 7:
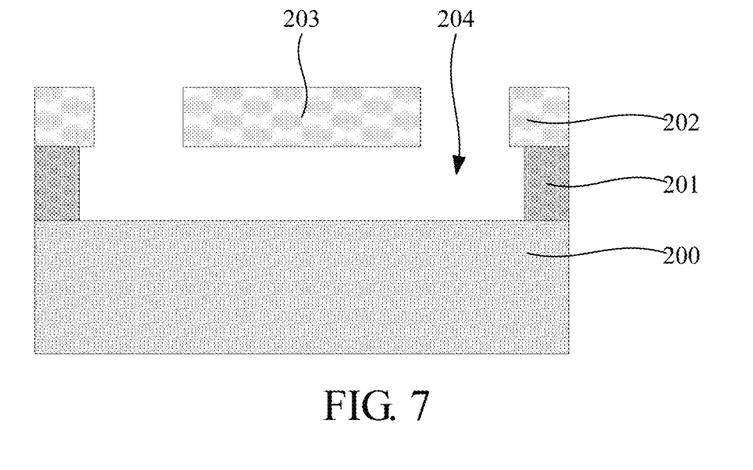
FIG. 7 is a cross-sectional view of a groove structure formed based on the structure of FIG. 6, according to an embodiment of the present disclosure.

In an embodiment, referring to FIGS. 6-7, the substrate 1 includes a silicon-on-insulator (SOI) substrate. The SOI substrate includes a bottom silicon layer 200, an intermediate buried oxide layer 201, and a top silicon layer 202. The test mass 203, nano-tethers (not shown in FIGS. 6-7) and the nano-photonic-crystal measurement unit (not shown in FIGS. 6-7) are prepared in the top silicon layer 202, and the groove structure 204 is formed in the intermediate buried oxide layer 201. A material of the top silicon layer 202 is a monocrystalline silicon. In an embodiment, the thickness of the top silicon layer 202 may be several hundred nanometers, such as, 200-800 nm. For example, the thickness of the top silicon layer 202 is 300 nm, 500 nm, or 600 nm. The thickness of the intermediate buried oxide layer 201 and the bottom silicon layer 200 may be several hundred micrometers, such as, 300-900 μm. For example, the thickness of the intermediate buried oxide layer 201 and the bottom silicon layer 200 is 400 μm, 500 μm, 800 μm.

In an embodiment, during the process of acceleration measurements, the acceleration is characterized based on the resonant frequency through following formulas:

$$\frac{d\omega_o}{d\alpha} = \frac{\omega_o \epsilon_0 n^4}{2} \int dx (2Re\{E_x^* E_y\} P_{44} S_{xy} + 2Re\{E_x^* E_z\} P_{44} S_{xz} + 2Re\{E_y^* E_z\} P_{44} S_{yz} +$$
$$|E_x|^2 (P_{11} S_{xx} + P_{11}(S_{yy} + S_{zz})) + |E_y|^2 (P_{11} S_{yy} + P_{12}(S_{xx} + S_{zz})) +$$
$$|E_z|^2 (P_{11} S_{zz} + P_{13}(S_{xx} + S_{yy}))) \Big/ \int dx \epsilon |E|^2$$

$d\omega_o$ represents the change of the resonant frequency, $d\alpha$ represents a displacement after standardization, P represents a photoelastic coefficient of the device layer 101, $\epsilon$ represents a dielectric constant of the device layer 101, S represents a strain tensor of the device layer 101, E is a photoelectric field intensity, and $$\frac{d\omega_o}{d\alpha} = -\epsilon_0 n^4 PS.$$

When the test mass 102 is subjected to the acceleration a, it is determined that the test mass 102 is also subjected to the force F according to the formula F=ma, and the nano-photonic-crystal measurement unit 104 connected to the test mass 102 is also subjected to the force F. According to the formula P=dF/dA (where P represents a stress, A represents an area), the force F exerted on the nano-photonic-crystal measurement unit 104 generates the stress P in the nano-photonic-crystal measurement unit 104, and at the same time, a strain is also generated in the nano-photonic-crystal measurement unit 104. For a certain material, there is a relationship between the stress and the strain, including an elastic stage, a nano-photonic-crystal detector works in the elastic stage of the material, σ=E*p, E represents an elastic modulus of the material, p represents the stress, and σ represents the strain. The strain here is the strain tensor S used in above formulas. For the nano-photonic-crystal measurement unit 104, the strain tensor S may be obtained by detecting the resonant frequency of the nano-photonic-crystal resonant cavity, and then the acceleration may be obtained based on the above description. Above formulas deduce a relationship between the frequency change of the nano-photonic-crystal resonant cavity and the strain. Combined the relationship between the frequency change of the nano-photonic-crystal resonant cavity and the strain, the relationship between the strain and the stress, with the relationship between the stress and the acceleration, a relationship between the frequency change of the nano-photonic-crystal resonant cavity and the acceleration may be obtained.

In an embodiment, the accelerometer structure further includes an optical waveguide structure (not shown in figures). The optical waveguide structure is connected to the nano-photonic-crystal resonant cavity and used to measure the resonant frequency.

In an embodiment, a balanced scheme, including a laser, a beam splitter, a variable optical attenuator, an optical waveguide, an optical waveguide coupler, a balanced photodetector, and an electronic spectrum analyzer, is used the acceleration measurement. An optical beam emitted by the laser enters the beam splitter through an optical fiber or an optical waveguide, and the beam is split into a signal beam and a reference beam by the beam splitter. The signal beam then passes through the first variable optical attenuator, the optical waveguide coupler, the nano-photonic-crystal resonant cavity, the optical waveguide coupler, the optical waveguide, and the balanced optical detector in sequence, and is finally converted into a first electrical signal. The reference light passes through the optical waveguide, the second variable optical attenuator, and the balanced photodetector in sequence, and is finally converted into a second electrical signal. The balanced photodetector transmits electrical signals (the first and second electrical signals) to the electronic spectrum analyzer to obtain the resonant frequency of the nano-photonic-crystal resonant cavity.

In an embodiment, the nano-photonic-crystal measurement unit 104 includes photonic-crystals. Photonic-crystals refer to artificial periodic dielectric structures with photonic band-gaps (PBG). Photonic-crystals are therefore also referred to as PBG photonic-crystal structures. The nano-photonic-crystal resonant cavity may be composed of conventional photonic-crystals, and include one or more resonant cavities. The photonic-crystals may be formed by periodically forming holes in silicon materials or silicon nitride materials, so as to form a periodic dielectric structure (The dielectric constant of holes is different that of the materials, so periods are generated).

Figure 10:
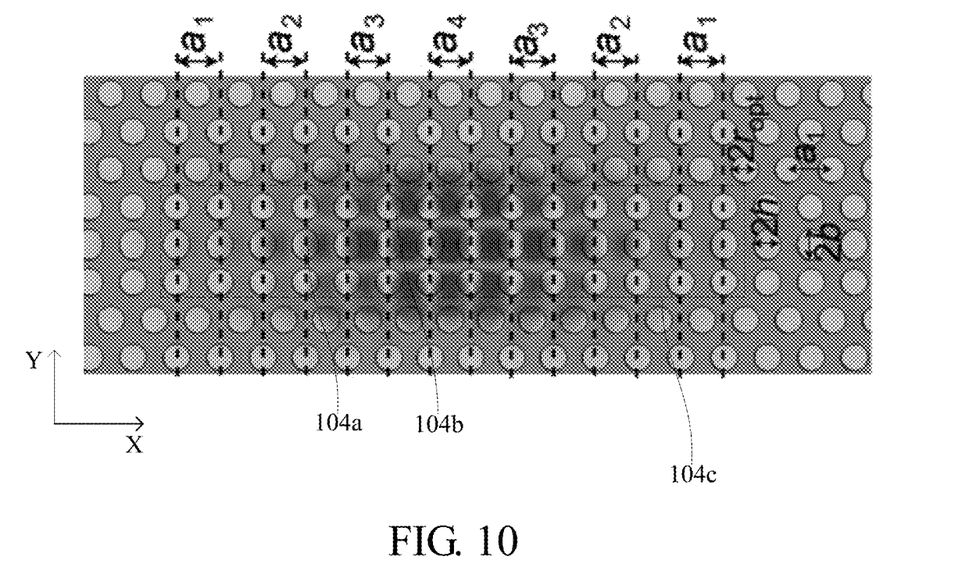
FIG. 10 shows an exemplary arrangement of holes that form a nano-photonic-crystal resonant cavity according to an embodiment of the present disclosure.

In an embodiment, the optical cavity is designed in the present disclosure. As shown in FIG. 10, a specific structure of the nano-photonic-crystal measurement unit 104 (the nano-photonic-crystal resonant cavity). The nano-photonic-crystal measurement unit 104 includes a central measurement area 104c. The central measurement area 104c has an X direction and a Y direction that are perpendicular to each other. Along the Y direction, several rows of artificial periodic holes form periodic dielectric structures. The central measurement area 104c includes at least one row of first holes, and at least two rows of second holes respectively located on two sides of the first holes along the Y direction. In an embodiment, the central measurement area 104c includes one row of first holes and two rows of second holes. The arrangement of each row of holes in the central measurement area 104c along the X direction is as follows: two adjacent holes in each row form a group, and a hole distance exists between the two adjacent holes in each group, the further the group is away from a center of the central measurement area 104c, the smaller the corresponding hole distance becomes, thereby forming the nano-photonic-crystal resonant cavity. For example, along the X direction, the arrangement of the periodic holes in each column is as follows: two adjacent holes in all first holes form a group, and a hole distance exists between the two adjacent first holes in each group, the further the group is away from a center of the central measurement area 104c, the smaller the corresponding hole distance becomes, thereby forming the resonant cavity. In an embodiment, referring to FIG. 10, in the periodic holes of each column, two adjacent first holes form one group, distances between two adjacent first holes are a1, a2, a3, and a4 respectively, which is an arithmetic series.

As shown in FIGS. 10, a1, a2, a3, and a4 is an arithmetic series. In an embodiment, a1 is the minimum and a4 is the maximum. For example, a1=450 nm, a2=456.7 nm, a3=463.3 nm, a4=470 nm. In another embodiment, a1 is the maximum and a4 is the minimum. In an embodiment, the size of holes may be designed simultaneously. For example, the second holes are circular, with a diameter of 2r; the first holes 104a are elliptical, with a long axis of 2b and a short axis of 2h. Values of b and h may be adjusted to achieve a better optomechanical coupling efficiency, thereby making the measurement of the acceleration more accurate. In another embodiment, holes outside the central measurement area 104c are circular, with a diameter of 2r. In this embodiment, the second holes are also circular, with a diameter of 2r. The existing nano-photonic-crystal with second holes 104b in the present disclosure can be further optimized. The size and position of part of the second holes can be adjusted to be as same as those of the first holes, i.e., the second holes 104b can be adjusted to be elliptical.

Figure 8:
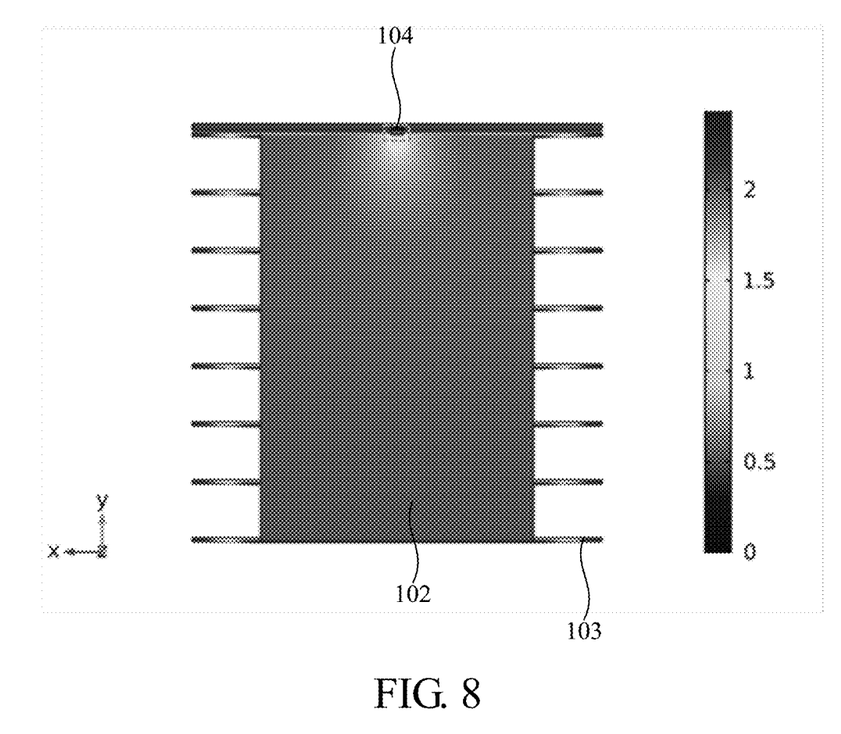
FIG. 8 is a schematic diagram of a deformation of a test mass when the test mass is displaced according to an embodiment of the present disclosure.
Figure 9:
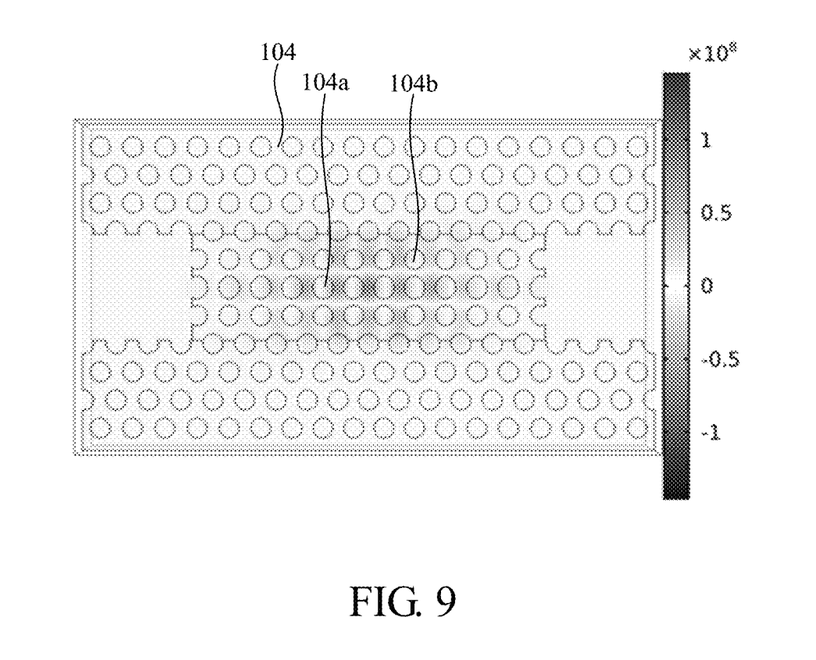
FIG. 9 is a partial enlarged view of a nano-photonic-crystal measurement unit in an accelerometer structure according to an embodiment of the present disclosure.
Figure 11:
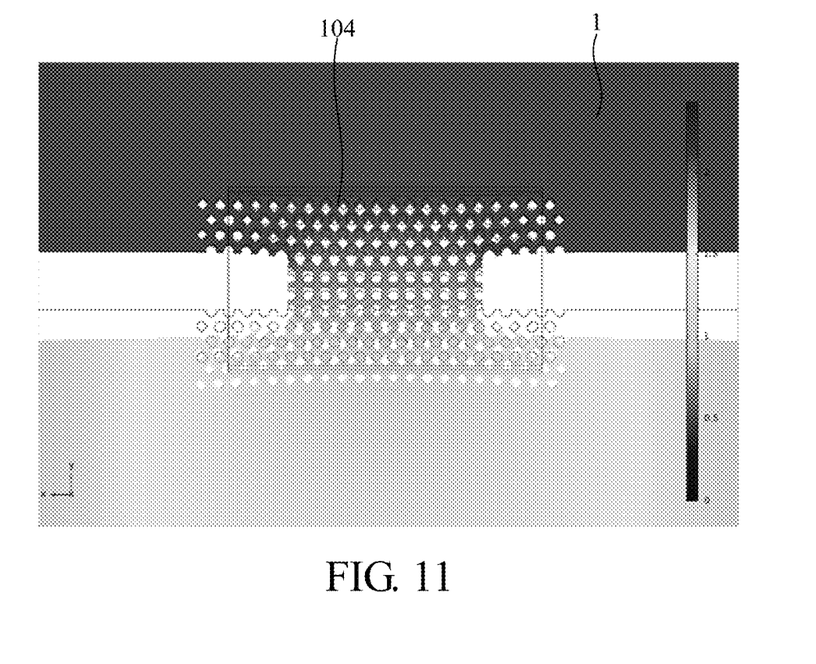
FIG. 11 is an enlarged view of the structure of FIG. 8 according to an embodiment of the present disclosure.
Figure 12:
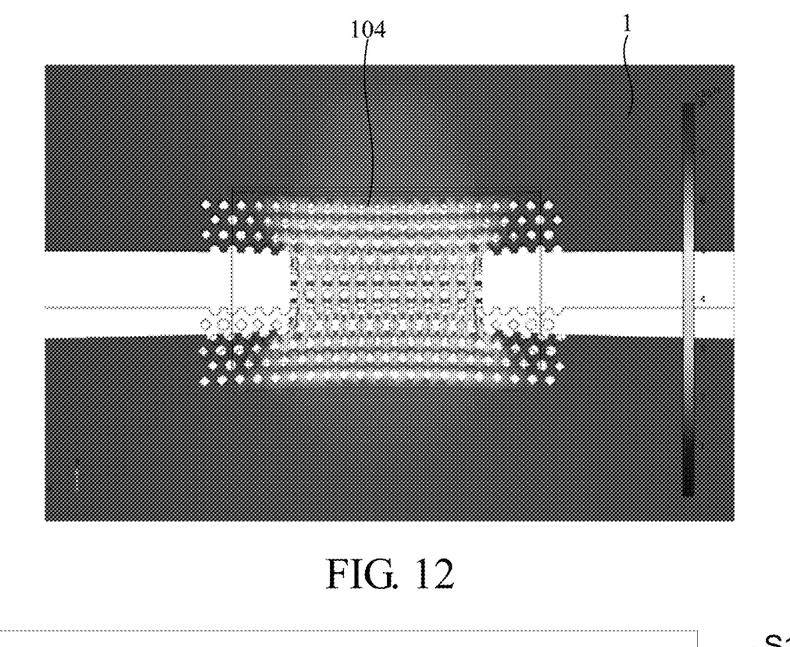
FIG. 12 is a heat map showing tensions in a nano-photonic-crystal measurement unit according to an embodiment of the present disclosure.

FIG. 8 is a schematic diagram illustrating a deformation of the test mass when the test mass is displaced according to an embodiment of the present disclosure. FIG. 8 also shows the test mass 102, nano-tethers 103, and the nano-photonic-crystal measurement unit 104. FIG. 9 is a partial enlarged view of a nano-photonic-crystal measurement unit in an accelerometer structure according to an embodiment of the present disclosure. FIG. 9 is also a light field distribution map with a bar on the right side, colors on the lower part of the bar represents negative light field intensities, colors on the upper part of the bar represents positive light field intensities, and the blank in the middle of the bar represents zero intensity. FIG. 10 shows an exemplary arrangement of holes in the nano-photonic-crystal resonant cavity according to an embodiment of the present disclosure. FIG. 11 shows deformation of the nano-photonic-crystal measurement unit 104 when the test mass 102 is displaced. FIG. 12 shows tension mapping in the nano-photonic-crystal measurement unit 104 according to an embodiment of the present disclosure. Where the tension is represented by a bar in FIG. 12, the upper part of the bar represents a stress is large. The accelerated signal (the accelerated signal is transformed into the stress and strain experienced by the material) and the optical signal are coupled together through the photoelastic-optomechanical coupling (the photoelasticity refers to the relationship between the stress and the dielectric constant).

In an embodiment, the nano-photonic-crystal resonant cavity is configured based on an optomechanical coupling rate. The optomechanical coupling rate $g=g_0\sqrt{\bar{n}_{cav}}$, $g_0$ represents a single-photon coupling rate, $\bar{n}_{cav}$ represents the number of photons in the resonant cavity. The number of photons is determined by a quality factor (Q-factor) of the nano-photonic-crystal resonant cavity and the light intensity of the laser. The Q-factor of the nano-photonic-crystal resonant cavity is controlled by the shape of the nano-photonic-crystal resonant cavity, and the number of photons in the nano-photonic-crystal resonant cavity is adjusted by adjusting the light intensity of the laser, finally the optomechanical coupling rate is changed. That is, the higher the Q-factor, the more photons in the nano-photonic-crystal resonant cavity, and the higher the optomechanical coupling rate. For example, the optomechanical coupling rate g is acquired through the formula $$g = \frac{d\omega_o}{d\alpha} x_{zpf} = \frac{d\omega_o}{d\alpha} \sqrt{\frac{h}{2m_{eff} w_m}},$$

where h represents the Planck's constant, $m_{eff}$ represents an effective weight of the test mass, and $w_m$ represents the resonant frequency of the test mass. An improved optomechanical coupling rate helps increase the photoelastic coefficient. The higher the quality factor (Q-factor) of the nano-photonic-crystal resonant cavity, the more photons stored in the nano-photonic-crystal resonant cavity. So the strain in a "spring" is more sensitively detected. Sensitivity of the detection is proportional to the square root of the number of photons in the nano-photonic-crystal resonant cavity.

Thanks to a micro-nano platform design, the photoelastic opto-micromechanical accelerometer sensor has many advantages, such as, low cost, a chip-level compact structure, low power consumption, flexible installation, etc. And thanks to the optical measurement principle, the optical readout provides an excellent acceleration resolution and an anti-electromagnetic-interference ability, the photoelastic opto-micromechanical accelerometer sensor overcomes a problem of an excessive noise of the existing MEMS sensor, and provides a high precision, a wide frequency range, a large measurement range, and fast response acceleration information.

Embodiment 2

Figure 1:
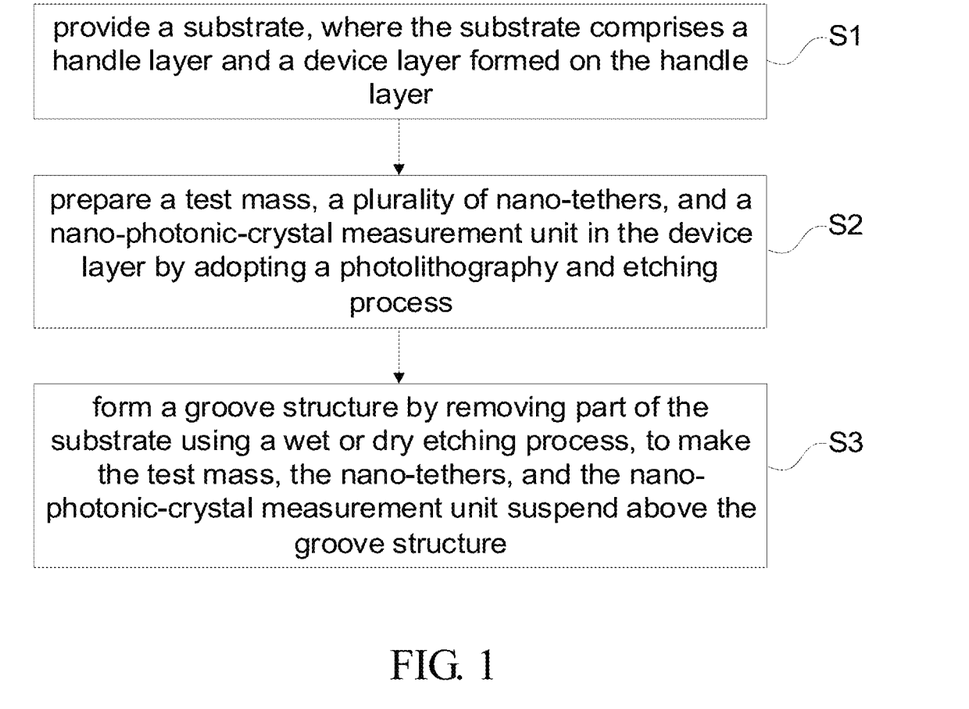
FIG. 1 is a flowchart of a method for preparing an accelerometer structure according to an embodiment of the present disclosure.
Figure 2:
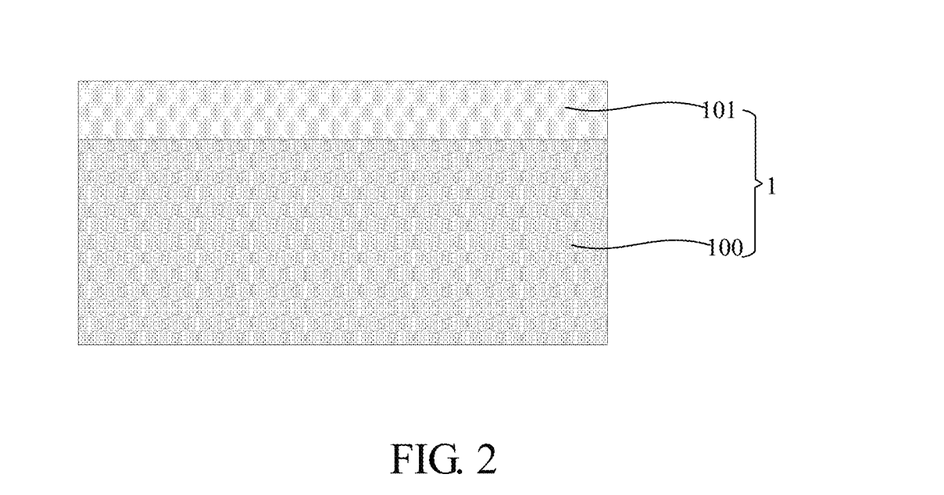
FIG. 2 is a schematic diagram of a substrate in an accelerometer structure according to an embodiment of the present disclosure.

Referring to FIGS. 1-7, a method for preparing an accelerometer structure described in any one of Embodiment 1 is provided in the present disclosure. The relevant structure and description of the accelerometer structure in this embodiment are similar to those of embodiment 1. The method for preparing the accelerometer structure includes the following steps:

As shown in FIG. 1, FIG. 2 and FIG. 6, step S1 is first performed which provides a substrate 1, where the substrate 1 comprises a handle layer 100 and a device layer 101 formed on the handle layer 100.

In an embodiment, the handle layer 100 includes a silicon layer, and the device layer 101 includes a silicon nitride layer. In an embodiment, the device layer 101 is formed on handle layer 100 by plasma enhanced chemical vapor deposition.

Figure 3:
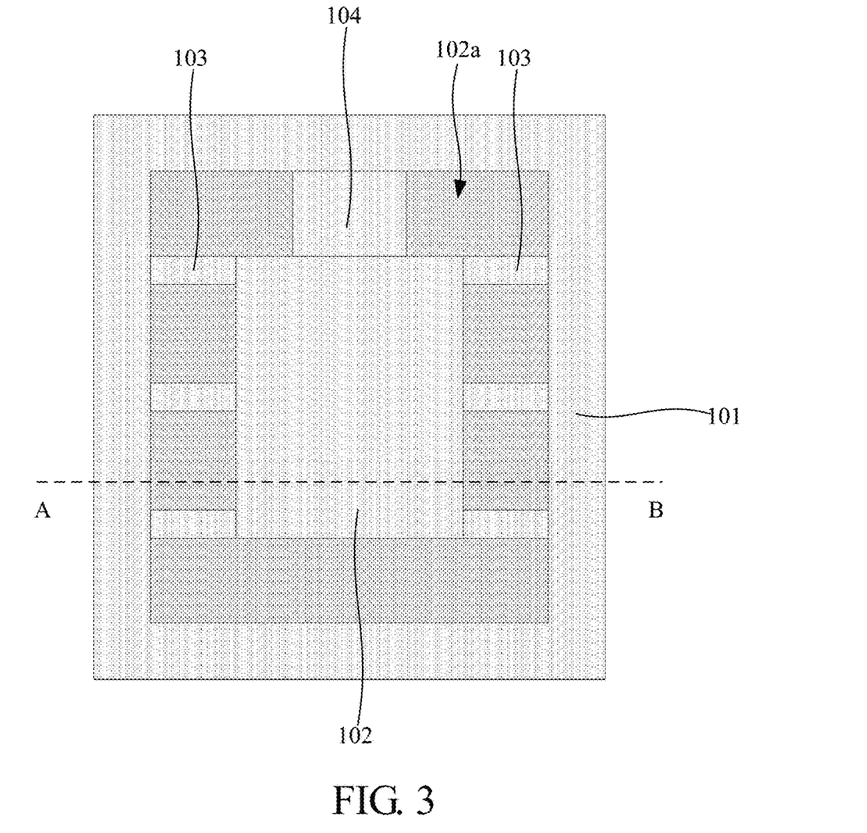
FIG. 3 is a schematic plane structural diagram of a test mass, nano-tethers, and a nano-photonic-crystal measurement unit in an accelerometer structure according to an embodiment of the present disclosure.
Figure 4:
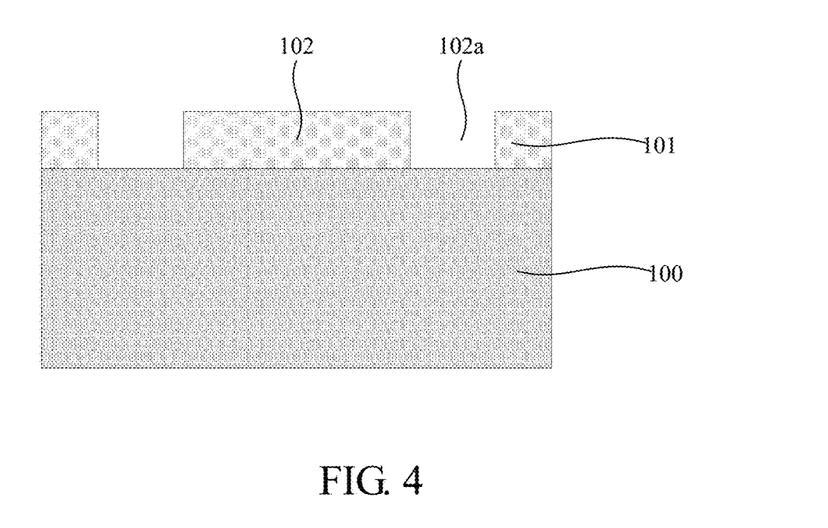
FIG. 4 is a cross-sectional view of the structure of FIG. 3, with the cutting plane passing through the line A-B shown in FIG. 3, according to an embodiment of the present disclosure.

As shown in FIG. 1, FIG. 3 and FIG. 4, step S2 is secondly performed which prepares a test mass 102, nano-tethers 103, and a nano-photonic-crystal measurement unit 104 in the device layer 101 by adopting a lithography process or an electron beam exposure and etching process.

In an embodiment, a mask layer (not shown in the figures) is formed on the device layer 101 first. For example, a mask pattern (for example, including a mechanical resonant cavity and a nano-optical-crystal resonant cavity) is obtained by adopting a lithography process based on exposure development technology. The mask pattern is transferred into the device layer 101 through an etching process to form patterned openings 102a. Finally, functional components required by an accelerometer are obtained by adopting an ICP-RIE process. The remaining mask layer is removed after the mask pattern is transferred. In addition, the surface of the substrate is also cleaned before the mask layer is formed.

Figure 5:
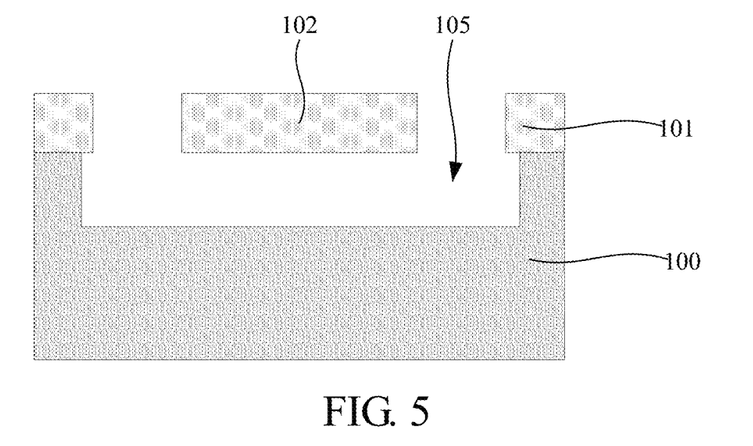
FIG. 5 is a cross-sectional view of a groove structure formed based on the structure of FIG. 4, according to an embodiment of the present disclosure.

As shown in FIG. 1 and FIG. 5, step S3 is lastly performed which forms a groove structure by etching a portion of the handle layer 100 using a wet or dry etching process (such as, etching from the pattern openings 102a), to suspend the test mass 102, nano-tethers 103, and the nano-photonic-crystal measurement unit 104 above the groove structure 105. The shape of the groove structure 105 is a rectangle in FIG. 5. In other embodiments, the shape of the groove structure 105 is a triangle or an irregular shape, which depends on a corrosion method and a material of the substrate. For example, for a structure including a silicon layer and a silicon nitride layer on the silicon layer, a portion of the silicon layer is etched by a wet chem process (using, e.g., potassium hydroxide) or a dry etch process (using, e.g., xenon difluoride), to suspend optical crystals and mechanical structures.

In an embodiment, as shown in FIG. 6 and FIG. 7, another method for preparing the accelerometer structure is provided. In the embodiment, the substrate 1 includes a silicon-on-insulator (SOI) substrate. The SOI substrate includes a bottom silicon layer 200, an intermediate buried oxide layer 201, and a top silicon layer 202. The top silicon layer 202 is used as the device layer 101. The bottom silicon layer 200 and the intermediate buried oxide layer 201 are used as the handle layer 100. Where the intermediate buried oxide layer 201 is etched by using a wet or dry etching process, to form the groove structure 105. The shape of the groove structure 105 is a rectangle in FIG. 7. In other embodiments, the shape of the groove structure 105 is a triangle or an irregular shape, which depends on the corrosion method and the material of the substrate. For the intermediate buried oxide layer 201 in the SOI structure, a portion of the intermediate buried oxide layer 201 (e.g., a silicon oxide) is etched by a wet chem. process (using, e.g., hydrofluoric acid) or a dry etching (e.g., hydrofluoric acid vapor) process. The test mass 203, nano-tethers and the nano-photonic-crystal measurement unit are formed in the top silicon layer 202.

Embodiment 3

Figure 13:
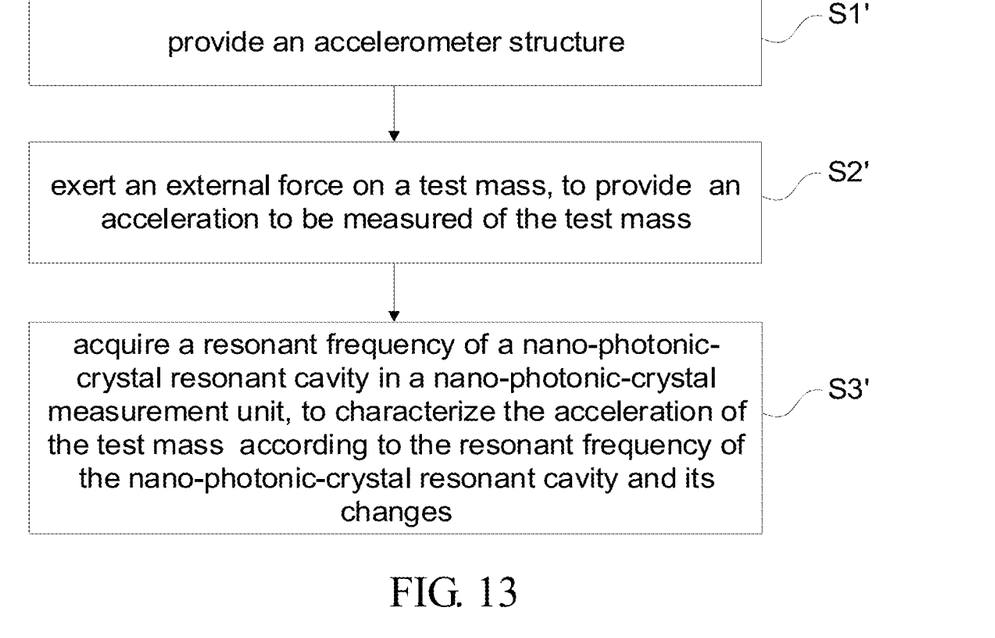
FIG. 13 is a flowchart of an acceleration measurement method by using an accelerometer structure according to an embodiment of the present disclosure.

As shown in FIG. 13, an acceleration measurement method adopting an accelerometer structure described in embodiment 1 is provided in the present disclosure. The relevant structure and description of the accelerometer structure are similar to those of embodiment 1. The acceleration measurement method includes following steps:

S1', providing the accelerometer structure as described in the embodiment 1.

S2', exerting an external force on the test mass, to provide the acceleration to be measured of the test mass. Specifically, the external force is exerted on the chip formed with the accelerometer structure.

S3', acquiring the resonant frequency of the nano-photonic-crystal resonant cavity in the nano-photonic-crystal measurement unit, to characterize the acceleration of the test mass according to the resonant frequency of the nano-photonic-crystal resonant cavity and its changes.

For example, the resonant frequency of the nano-photonic-crystal resonant cavity and its changes are acquired through an optical waveguide structure.

As described above, the present disclosure provides a photoelasticity-based opto-micromechanical accelerometer structure, which uses a cavity resonance tension sensor in a nano-photonic-crystal resonant cavity to measure a tension of the nano-photonic-crystal resonant cavity. The tension is generated by the acceleration of the chip exerted on the nano-photonic-crystal resonant cavity. The test mass is displaced by the acceleration of the chip and the tension is generated by the displacement of the test mass. The test mass is displaced by the acceleration and the tension is generated by the displacement of the test mass. The tension is concentrated in the nano-photonic-crystal resonant cavity, which makes the measurement of the tension more accurate and the resolution higher. Photoelastic optomechanical coupling is also increased due to the nano-photonic-crystal resonant cavity. In summary, the present disclosure effectively overcomes various shortcomings in the prior art and has a high industrial value.

The above-mentioned embodiments are merely illustrative of the principle and effects of the present disclosure instead of limiting the present disclosure. Modifications or variations of the above-described embodiments may be made by those skilled in the art without departing from the spirit and scope of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. An accelerometer structure, comprising:
a substrate, wherein a groove structure is formed in the substrate;
a test mass, suspended above the groove structure;
a plurality of nano-tethers, suspended above the groove structure, for connecting the test mass and the substrate, wherein a force exerted on the test mass is in a first direction; wherein the number of the nano-tethers is an even number, and the nano-tethers are symmetrically arranged on two sides of the test mass along the first direction; and a nano-photonic-crystal measurement unit, suspended above the groove structure, for connecting the test mass and the substrate; wherein the nano-photonic-crystal measurement unit is arranged on one side of the test mass, and a connecting line between the nano-photonic-crystal measurement unit and the test mass is parallel to a direction of the force exerted on the test mass, wherein the nano-photonic-crystal measurement unit comprises a central measurement area, and the central measurement area is defined with an X direction and a Y direction that are perpendicular to each other, the central measurement area comprises at least one row of first holes, and at least two rows of second holes located on two sides of the first holes along the Y direction;

wherein along the X direction, two adjacent first holes or second holes in each row form a group, a hole distance exists between the two adjacent holes in each group, and the further the group is away from a center of the central measurement area, the smaller the corresponding hole distance becomes, thereby forming a nano-photonic-crystal resonant cavity in the nano-photonic-crystal measurement unit, and an acceleration of the test mass is characterized by a resonant frequency of the nano-photonic-crystal cavity.

2. The accelerometer structure according to claim 1, wherein a direction perpendicular to the first direction is a second direction, and the length of the nano-tethers along the second direction is in a range of 50 μm to 1 mm, and the width of the nano-tethers along the first direction is in a range of 300 nm to 10 μm.

3. The accelerometer structure according to claim 1, wherein a material of the test mass includes any one of silicon nitride and silicon; a material of the nano-photonic-crystal measurement unit includes any one of silicon nitride and silicon; a material of the nano-tethers includes any one of silicon nitride and silicon.

4. The accelerometer structure according to claim 1, further comprising:

an optical waveguide structure, connected to the nano-photonic-crystal resonant cavity.

5. The accelerometer structure according to claim 1, wherein the resonant cavity is configured based on an optomechanical coupling rate, wherein the optomechanical coupling rate is given by the formula $g=g_0\sqrt{\bar{n}_{cav}}$, wherein $g_0$ represents a single-photon coupling rate, and $\bar{n}_{cav}$ represents the number of photons in the nano-photonic-crystal resonant cavity.

6. A method for preparing an accelerometer structure of claim 1, comprising:

providing a substrate, wherein the substrate comprises a handle layer and a device layer formed on the handle layer;

preparing a test mass, a plurality of nano-tethers, and a nano-photonic-crystal measurement unit in the device layer by adopting a photolithography and etching process; and forming a groove structure by removing part of the substrate using a wet or dry etching process, to make the test mass, the nano-tethers, and the nano-photonic-crystal measurement unit suspend above the groove structure.

7. The method for preparing an accelerometer structure according to claim 6, wherein the handle layer is a silicon layer, and the device layer is a silicon nitride layer; or, the substrate is a silicon-on-insulator substrate, wherein the silicon-on-insulator substrate comprises a top silicon layer and an intermediate buried oxide layer, wherein the test mass, the nano-tethers and the nano-photonic-crystal measurement unit are formed in the top silicon layer, and the groove structure is formed in the intermediate buried oxide layer.

8. An acceleration measurement method adopting an accelerometer structure of claim 1, comprising:

providing the accelerometer structure of claim 1;

exerting an external force on the test mass, to provide an acceleration to be measured of the test mass; and acquiring the resonant frequency of the nano-photonic-crystal resonant cavity in the nano-photonic-crystal measurement unit, to characterize the acceleration of the test mass according to the resonant frequency of the nano-photonic-crystal resonant cavity and its changes.

9. The acceleration measurement method according to claim 8, wherein the resonant frequency of the nano-photonic-crystal resonant cavity and its changes are acquired through an optical waveguide structure.

* * * * *